Jan. 21, 1964   F. L. YERZLEY   3,118,957
GAS-LIQUID CONTACT APPARATUS AND METHOD
Filed July 7, 1959   2 Sheets-Sheet 1

INVENTOR,
FELIX L. YERZLEY
BY
Virgil C. Kline
ATTORNEY.

Jan. 21, 1964   F. L. YERZLEY   3,118,957
GAS-LIQUID CONTACT APPARATUS AND METHOD
Filed July 7, 1959   2 Sheets-Sheet 2
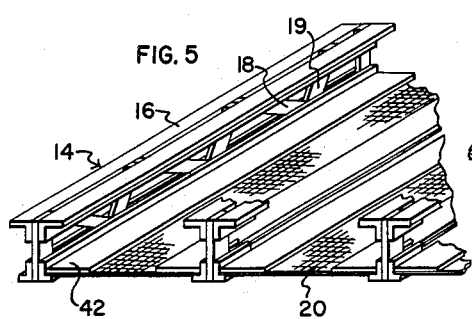
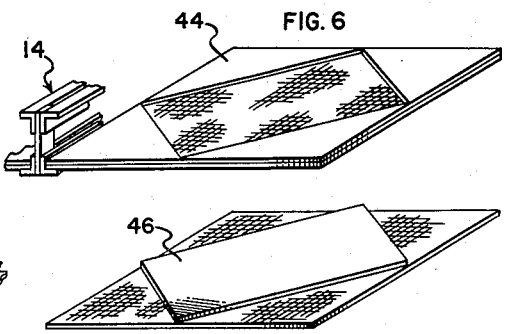
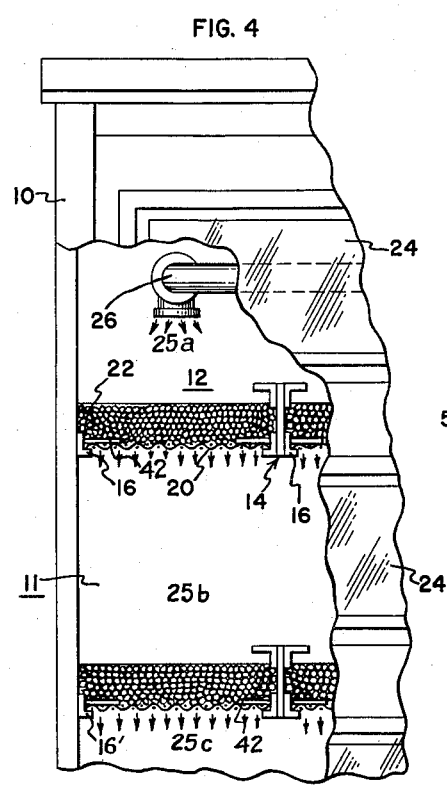
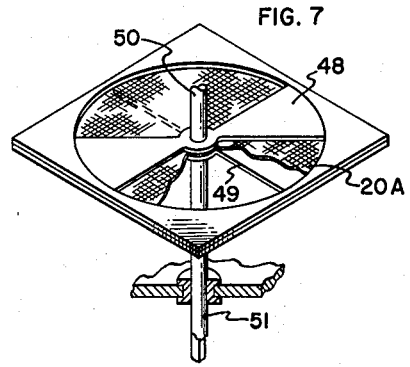
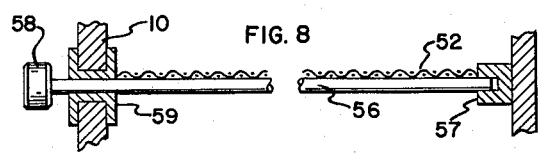
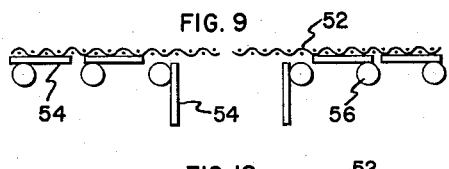
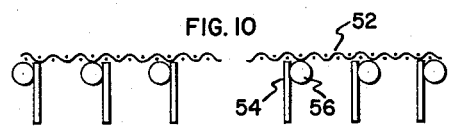
INVENTOR.
*Felix L. Yerzley*
BY
ATTORNEY

United States Patent Office 3,118,957
Patented Jan. 21, 1964

3,118,957
GAS-LIQUID CONTACT APPARATUS
AND METHOD
Felix L. Yerzley, 66 Harrison St., Verona, N.J.
Filed July 7, 1959, Ser. No. 825,594
5 Claims. (Cl. 261—24)

This invention relates to improvements in gas-liquid contact apparatus and method and is particularly applicable to air-scrubbers, that is, to the removal of constituents such as acids or other corrosive substances, dust, and the like from large volumes of counter-current flowing air.

In my prior patent No. 3,005,679, issued October 24, 1961, an entirely new principle is revealed for stable continuous counter-current upward flow of air or other gas through a body of liquid flowing downwardly through one or more stationary beds filled with particles of aggregate such as crushed rock.

This patent discloses that under defined conditions illustrated with specific examples, a bed or layer of aggregate in substantial depth, mechanically supported on an open wire mesh screen or other substantial open structure, liquid supplied from above the bed may be made to accumulate in the spaces between the pieces of aggregate by virtue of the sustaining force of the upwardly rising gas so that such spaces are substantially filled with liquid except for bubbles of gas rising through it in counter-current flow.

The particular purpose of the present invention is to broaden the conditions under which balanced flow of opposed gases and liquid can be established in beds of aggregate.

Experience has shown examples of balance between counter-currently flowing gas and liquid which were overly critical in adjustment of the flow rate for either moving phase. Also it has been found that under conditions of such critical balance the flow rate for either the liquid or gaseous phase might be too low for practical or at least maximum usefulness.

The foregoing difficulties suggest the advantage of using a packing material or chips having larger inter-piece spaces to provide greater freedom of movement. The advantage of enlarging the spaces, by using larger chips, may be lost however, if the liquid is not built up, or stored in the interstices to provide a bed which readily becomes and remains in a flooded or substantially filled condition.

I have found that larger chips than those specifically mentioned in Patent No. 3,005,679 may be used in the following manner. Specifically I have used basaltic stone quarried from the Watchung Range in Essex County, N.J., which is graded as passing through a ⅝″ square opening screen. This is considerably coarser than #3 Carrara chips which are known as stone imported from Italy. Under conditions described as applying to #2 or #3 Carrara chips in my prior patent, ⅝″ chips of bluestone would not under some conditions support the required balance and filling of voids with liquid. I have found, however, that if a portion of the aggregate supporting screen is closed either by overlaying a sheet of some relatively impervious material over it, or by supporting impervious vanes on the underside, balance can again be achieved.

While there is considerable flexibility in permissible and useful values of gas and liquid flow with such an arrangement, once the proportion of open area to closed has been established for a required problem, still greater flexibility of control is also desirable. For example, at the extremes of high liquid and gas flow for a fixed arrangement, an excess of liquid may develop on the upper surface of the stones causing an undesirable overplay of superficial bubbles. These contribute little to the effectiveness of interphase contact while resulting in excessive pressure drop through the bed, and result also in excessive liquid carry-over into the air stream.

On the other hand relatively low flow values for gas and for liquid result in only partial filling of the depth of the bed with resulting loss in contact effectiveness.

The condition of balanced flow herein means that there is an equilibrium state with flooded beds. Generally this equilibrium state exists with the depth of liquid corresponding to the depth of the packing or aggregate.

Under the conditions described particularly in my Patent No. 3,005,679 a broad correspondence is necessary between areas of packing support, gas and liquid flow rates, physical characteristics of the liquid and physical form of the packing, i.e. particle shape and size, in order to attain conditions of balance. As the particle size is made smaller, the conditions become more critical, and as the particle size is made larger a reasonable degree of balance is obtainable over an increasing range of gas and liquid flow rates. Obvious limits exist, however. For small particle sizes, the voids quickly fill with liquid and in the face of substantial gas flow through-flow of liquid may not occur to any substantial degree.

As packing size, or void space, is increased control of the liquid charge gradually decreases from the point of positive holding for small packing to the point of complete flow-through of liquid without holding for large packing. Restoration of liquid control is achieved by introduction of the "priming" strips, herein referred to as baffles or flooding plates. By suitable mechanical means strips, or equivalent vanes or baffles, mounted in or adjacent to the plane of the packing supports, may be manually or automatically adjusted or varied to an ideal setting for any particular conditions of gas and liquid involved, the desirable or required flow of each and the preferred type of aggregate for this operation.

The present invention is thus of particular importance in the operation of counter-current gas-liquid contact system where relatively large granules are utilized as the aggregate, to permit upward flow of large volumes of gas, without undue obstruction of the gas flow through the bed and with the bed properly flooded with liquid initially and during the operation.

The above and other objects of the invention may be clear from the following descriptions when considered in connection with the drawings, wherein, FIG. 1 is a front elevational view showing a preferred form of the apparatus.

FIG. 4 is a fragmentary front view of the apparatus, parts being cut away to show the aggregate beds and supporting structure with flow controlling baffle sheets applied.

FIG. 5 is a perspective fragmentary view illustrating one form of the invention.

FIG. 6 is a similar view, illustrating a modification of the invention with a pair of screens for supporting spaced alined granule beds.

FIG. 7 is an inverted perspective view illustrating a further modification of the invention.

FIGS, 8, 9 and 10 illustrate a further modification of the invention, FIG. 8 being a longitudinal vertical sectional view of the supporting screen and one control member, FIGS. 9 and 10 being similar sectional views at right angles to that shown in FIG. 8, with the flooding plates in operative and inoperative positions, respectively.

Figure 1:
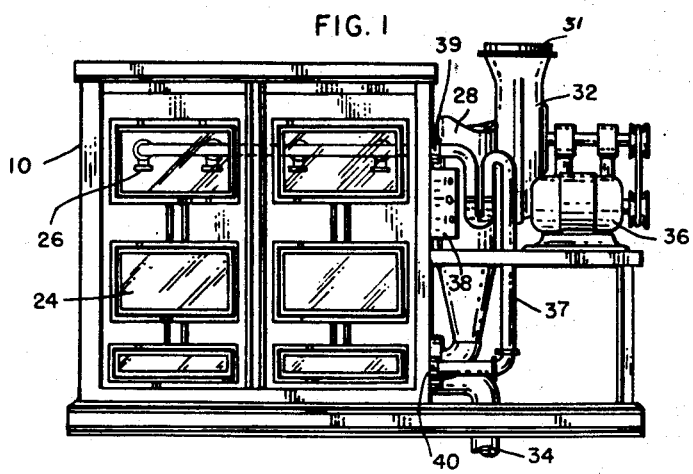
Figure 2:
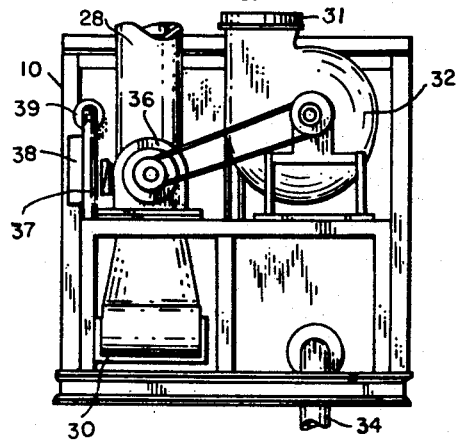
FIG. 2 is a side elevational view, taken from the right in FIG. 1.
Figure 3:
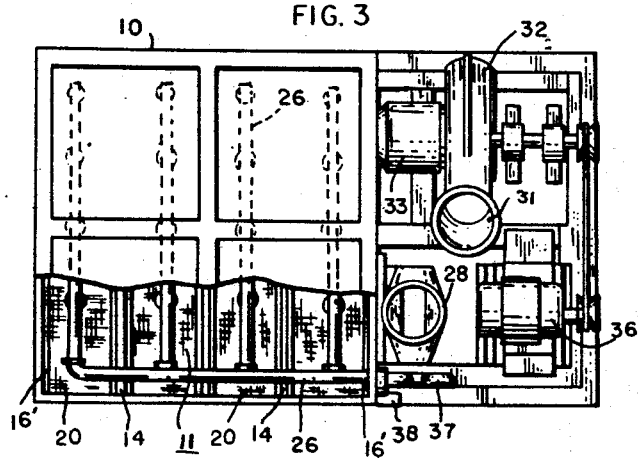
FIG. 3 is a top plan view thereof, parts being in section.

Referring now to FIGS. 1–4 the apparatus employed in the present invention comprises a hollow frame 10 of any suitable size and shape, the interior thereof constituting a contact chamber 11, to accommodate one or more beds 12 of aggregate. As shown in FIGS. 1–5 there are four such connecting beds at each of the two levels, extending lengthwise of the frame and supported on suitable trusses 14 each extending throughout the length of the chamber. The intermediate trusses are formed of pairs of upper and lower angle bars 16 connected to a reenforcing bar 18 bent to form angular connecting sections 19 extending between the upper and lower angle bars 16'. The edge bars may be formed as simple angle bars 16' secured to the vertical walls of the frame. Supporting screens 20 rest upon the flanges of the lower sets of angle bars for supporting the beds of packing or aggregate 22. It will be noted that the construction provides at each level four connected beds of aggregate which are in effect one continuous bed extending from wall to wall across the chamber and around the reenforcing bars within the frame and from end to end of the contact chamber.

The frame is provided with observation windows 24 front and back, if desired, positioned just above each of the trusses and aggregate beds, with one such window below the bottom bed, so that the functioning of the equipment can be observed. The entire frame is carefully constructed so that the entire frame is tightly sealed to assure proper operation of the equipment.

The packing beds divide the interior of the chamber 11 into three open chamber spaces. Liquid is supplied into the upper chamber space 25a through pipes 26, one placed over the center of each of the upper beds and formed with suitable spouts for supplying liquid to the upper surface of the upper bed. The intermediate chamber space 25b constitutes a transfer space for the downward passage of liquid and the upward flow of gas. The bottom space 25c beneath the lower bed serves for the introduction and distribution of the gas and for the collection and discharge of the used liquid through pipe 34.

Air or other gas is introduced into the bottom chamber through the large duct 28, opening at its discharge end into the bottom chamber 25c as shown at 30 and at its other end into the room, chamber, or hood containing the air or other gas to be decontaminated. The flow of gas may be provided by a suction fan 32 whose inlet pipe opens into the upper chamber 25a as at 33, the discharge gases from the outlet duct 31 passing to the space from which the impure air or gas was removed, or else to suitable discharge area. The fan is driven by a suitable device, shown as a motor 36. The difference in pressure between the upper and lower chambers gives an indication as to the effectiveness of the operation. This can be indicated by means of a manometer 37 provided with a scale 38 and having one end 39 opening into the upper chamber 25a and the other end 40 opening into the lower chamber 25c. The manometer reading will thus at all times show the difference in pressure above and below the packing beds and the pressure drop in the equipment.

The above equipment is designed to occupy a minimum of floor space and to treat large volumes of air or gas satisfactorily. Thus an equipment of this type having a processing chamber approximately 5 feet wide, 5 feet long and 5 feet high, with relatively coarse granules of aggregate, ⅝" crushed stone, e.g., with the aggregate beds 6 inches thick, will handle 2,000 cubic feet of air per minute satisfactorily with a water supply above the top bed of 5 to 20 gallons per minute, a water supply of 12 to 14 gallons being generally satisfactory. Of course the requirements vary widely for this type of equipment and the above is stated merely with this one size and type equipment which has been found particularly useful. Equipment and aggregate particles utilizing the same features has been constructed of other dimensions as well as with a large number of packing beds, instead of two as herein generally disclosed.

As noted above for certain operating conditions it is difficult to initiate and also to maintain an exact flooded condition in the beds, particularly where high gas flow is involved. It has been found possible to overcome this difficulty by limiting the flow of liquid and gas adjacent the lower portion of each bed, as described below.

In FIGS. 4 and 5 there is shown one way of controlling the flooding condition in a packing bed. A strip 42 of metal or plastic is placed above one or both sides of the supporting screen before the aggregate is introduced. The down flowing liquid is thus caused to flow away from the sides of the bed and to discharge nearer the central portion thereof. The upwardly moving gas stream is also guided toward this confined area where the liquid is discharged. The gaseous stream thus picks up or opposes the downward flow of liquid to such an extent that there is quickly established a balanced flow, with completely flooded bed, even though without such blocking strips the flooded condition is not readily or even ever achieved with certain flow conditions and sizes of aggregate.

Placing the blocking sheets over the edge portions of the bed serves a special function of introducing the liquid to a more nearly centered portion of the underlying bed, thus contributing, under certain conditions, to uniformity of operation of the equipment. It will be understood the size and number of sheets or strips 42 and their horizontal positions at the lower surface of the bed or beds may be varied as may be required for the exact conditions of the operations involved.

Referring now to FIG. 6 there is shown a special blocking construction for successive beds in the contact chamber. The upper bed is supplied with a quartered sheet of relatively impervious material 44, one quarter placed on each corner of the screen. The lower screen is blocked in a complementary manner, to cover the center of the screen with the impervious sheet. The liquid is thus guided away from the edge of the upper bed and discharges near the central portion of the underlying bed. The central blocking sheet 46 on the lower bed causes the liquid and the gases to move transversely as they pass through the contact chamber. After the blocking sheets are in place the aggregate is added, as described above.

The blocking devices of FIG. 7 utilize opposed stationary sector shaped strips 49 placed on the screen before the aggregate is applied. Beneath the screen and preferably in contact therewith a movable blocking sheet 48, formed with opposed similarly shaped and proportioned sectors, is secured to a supporting and operating rod 50, having an extension 51 projecting outside the frame for adjusting the position of the movable sheet without interrupting the operation of the equipment. The peripheral portion of the base of the bed, outside of the movable sectors may be made solid as shown or for certain operations may be made foraminous.

It will be understood that the view in FIG. 7 is an inverted perspective of the screen 20A supporting the aggregate for the upper bed, the extension 51 projecting through the top cover of the frame. For the bottom screen the same construction is used except that the rod 50 preferably has the extension 51 directed downwardly through the bottom wall of the frame for convenience of operation.

Referring now to FIGS. 8, 9 and 10, there is illustrated one form of adjustable baffle for adapting the operation for widely varied conditions. The screen indicated at 52 is supported by a suitable truss structure and in turn supports the bed of aggregate, as shown in FIGS. 1–4. Control of the flow of liquid and gases is accomplished by a succession of baffle plates 54 extending lengthwise of the bed and covering a major portion of the under surface of the screen and preferably in contact therewith. Each plate 54 is rigidly secured to a shaft 56 extending from end to end of the chamber 11. One end of each shaft may be supported on the interior wall of the frame as shown at 57, the other end preferably projecting through the chamber wall as shown at 59 and formed with an out-of-round portion 58 to facilitate adjustment of the individual plate to a blocking horizontal position as shown for most of the plates in FIG. 9 or to open, inoperative position as shown in FIG. 10. This construction gives practically unlimited control of the flow of fluids through the bed since all plates may be open or all closed or selected ones only may be opened or closed to meet any required condition.

While the above description is based primarily on the use of two separated aggregate beds, which construction has been found preferable for most operations, it will be understood that for some installations one bed or three or more may be required, of any requisite size and depth of bed, utilizing the features of the invention herein disclosed.

The blocking or flooding sheets or plates can be made of any suitable material for the purpose. Where a corrosive substance is to be removed from air or other gas, all parts of the unit, including these sheets or plates, are preferably made of stainless steel, titanium, or some highly resistant plastic such as polyethylene or Teflon (tetrafluoroethylene).

In summary it may be stated that I have found that blocking off certain areas adjacent the bottom of the bed as herein disclosed serves the intended function of assuring a flooded bed at all times, and surprisingly that this result does not materially detract from the operating capacity of the bed. Apparently the gas on contact with the down flowing liquid quickly spreads throughout the bed and causes all portions of the bed to function equally. Also the blocking plates or strips in themselves constitute only a slight impediment to the passage of gas through the packing beds.

The particular constructions here shown, while presently believed to be the best forms of devices now known for the intended purpose, are set forth for purposes of illustration only, and not with any intention of limiting the invention, whose scope is set forth in the claims appended hereto.

I claim:

1. A method of producing intimate contact between a liquid and gas in counter-current flow comprising, maintaining on an open mesh support having a normally open area for the flow of fluid therethrough a bed of discrete aggregate particles with open exposed top and bottom surfaces, flowing liquid onto the said top surface for down flow by gravity through said bed and normally open area of the support at a predetermined rate, exhausting gas from the region above said top surface to induce an upward flow of gas from below said support through said normally open area and through said bed at a rate sufficient to balance the said rate of flow of the downwardly flowing liquid thereby to cause the liquid to substantially completely fill the space between the aggregate particles and cause a flooding of the bed, and the maintenance thereof in flooded condition during normal operation solely by the upwardly flowing gas, maintaining in a completely obstructed condition a plurality of immediately adjacent openings together constituting a limited portion of the normally open area of said support to prevent the flow of liquid and gas through the openings constituting said limited portion and leaving the openings constituting the remainder of said normally open area completely unobstructed for the free flow of liquid and gas therethrough thereby to cause the liquid and gas contacting the obstructed limited portion of the normally open area to flow laterally of the portion of the support including the obstructed openings toward the unobstructed openings whereby the portion of the liquid flowing through the bed and contacting the portion of the support including the obstructed openings flows laterally of the support and downwardly through the unobstructed openings together with the remainder of the liquid, and the gas contacting the portion of the support including the obstructed openings flows first laterally below the support then upwardly together with the remainder of the gas through the unobstructed openings, and the gas diffuses laterally and flows upwardly substantially throughout the entire bed so that the capacity of the bed is not materially affected by the obstructing of the openings constituting a limited portion of the normally open area of the support, the said remainder of the normally open area constituted by the unobstructed openings being of a sufficient extent so that all of the liquid flows through the bed and support and no accumulation of liquid takes place when the downward flow of liquid is continued at said predetermined rate and the upward flow of gas is discontinued.

2. A method as recited in claim 1 wherein a plurality of like beds supported on individual open mesh supports having obstructed and unobstructed areas are maintained one above the other and the liquid is flowed onto the top surface of the uppermost bed for downflow by gravity first through said uppermost bed and its open mesh support and then onto the top surface of the next lower bed for down flow therethrough and its open mesh support, and the gas is induced to flow upwardly first through the lowermost open mesh support and bed and then through the next higher open mesh support and bed.

3. In a liquid-gas contact apparatus, a contact chamber, a fixed horizontal bed of discrete aggregate particles therein, a support comprising an open mesh screen for said bed, means for supplying a liquid to the upper portion of said bed at a predetermined rate for down-flow therethrough by gravity, means for inducing an upflow of gas through said support and aggregate bed for opposing said gravity downflow of liquid through said bed and support to balance the rate of flow of the liquid to fill the spaces between the particles to flood the bed with liquid and maintain said bed substantially completely flooded with said liquid during normal operation and blocking means positioned in obstructing relation adjacent a plurality of immediately adjacent openings together constituting a limited portion of the normally open area of the open mesh screen to prevent downward escape of liquid and upward passage of said gas through said limited portion leaving the remainder of the normally open area of said screen completely unobstructed for the free flow of liquid and gas therethrough, said blocking means comprising a flat, imperforate gas and liquid impervious plate and serving to produce lateral movement of liquid and gas away from the portion of the screen including the obstructed openings toward the remaining portion thereof, said remaining portion being of sufficient extent so that all of said liquid flows through the bed and no flooding of the bed takes place when the downward flow of liquid through the bed is continued at said predetermined rate and the upward flow of gas is discontinued, whereby all of the gas contacting both the obstructed and unobstructed portions of the normally open area of the open mesh screen flows through the unobstructed portion thereof and through the aggregate bed thereby facilitating the maintenance of said bed substantially completely flooded during the counter-current flow of said liquid and said gas through said bed without materially reducing the capacity of the bed.

4. A liquid gas contact apparatus as recited in claim 3, wherein a plurality of like horizontal beds, individual screen supports therefor and blocking means are positioned in the chamber one above the other and the means for supplying the liquid is positioned above the uppermost bed for supplying liquid to the upper surface of said bed for downflow by gravity first through said uppermost bed and screen and then to and through the next lower bed and screen, and said gas flow inducing means causes the gas to flow upwardly first through the lowermost screen and bed and then to and through the next higher screen and bed.

5. The apparatus recited in claim 3 and means for adjusting said blocking means to vary the extent of said obstructed limited portion of the normally open area of said screen for facilitating maintenance of said bed in a flooded condition under varying flow conditions in said bed.

(References on following page)

References Cited in the file of this patent

UNITED STATES PATENTS

| | | |
|---|---|---|
| 1,633,289 | Robinson | June 21, 1927 |
| 1,788,306 | Kline | Jan. 6, 1931 |
| 1,798,563 | Styrud | Mar. 31, 1931 |
| 1,835,683 | Weaver | Dec. 8, 1931 |
| 2,137,905 | Church et al. | Nov. 22, 1938 |
| 2,143,016 | Kleinschmidt | Jan. 10, 1939 |
| 2,428,922 | Shoresman | Oct. 14, 1947 |
| 2,603,533 | Rye | July 15, 1952 |
| 2,609,888 | Beringer | Sept. 9, 1952 |
| 2,676,670 | Gagnaire | Apr. 27, 1954 |
| 2,702,434 | Richardson et al. | Feb. 22, 1955 |
| 2,705,699 | Bresee | Apr. 5, 1955 |

FOREIGN PATENTS

| | | |
|---|---|---|
| 157,828 | Great Britain | Apr. 10, 1922 |
| 182,064 | Switzerland | Apr. 1, 1936 |
| 547,722 | Germany | Apr. 1, 1932 |
| 726,151 | Great Britain | Mar. 16, 1955 |